(12) United States Patent
Gambut-Garel et al.

(10) Patent No.: US 7,750,077 B2
(45) Date of Patent: Jul. 6, 2010

(54) METHOD FOR THE PRODUCTION OF POLYMETHYLVINYLSILOXANE RESINS WITH RECYCLING OF VOLATILE OLIGOORGANOSILOXANES

(75) Inventors: Lucile Gambut-Garel, Lyons (FR); José-Louis Roca-Ortega, Lyons (FR); Didier Dahler, Tassin la Demi-Lune (FR); Gérard Mignani, Lyons (FR); Christian Allandrieu, Villeurbanne (FR)

(73) Assignee: Bluestar Silicones France, Lyons (FR)

( * ) Notice: Subject to any disclaimer, the term of this patent is extended or adjusted under 35 U.S.C. 154(b) by 598 days.

(21) Appl. No.: 10/544,528

(22) PCT Filed: Jan. 26, 2004

(86) PCT No.: PCT/FR2004/050028

§ 371 (c)(1),
(2), (4) Date: May 1, 2006

(87) PCT Pub. No.: WO2004/072149

PCT Pub. Date: Aug. 26, 2004

(65) Prior Publication Data

US 2006/0241266 A1 Oct. 26, 2006

(30) Foreign Application Priority Data

Feb. 5, 2003 (FR) .................................. 03 01342

(51) Int. Cl.
*C08G 77/06* (2006.01)
(52) U.S. Cl. ............................ 525/54; 523/343; 528/34
(58) Field of Classification Search ........................ None
See application file for complete search history.

(56) References Cited

U.S. PATENT DOCUMENTS

| 3,632,619 | A | * | 1/1972 | Groenhof | .................... 556/453 |
| 3,898,256 | A | * | 8/1975 | Takamizawa et al. | ....... 556/451 |
| 5,010,148 | A | * | 4/1991 | Lewis | .......................... 525/464 |
| 5,741,876 | A | * | 4/1998 | Carpenter et al. | ............. 528/10 |
| 6,326,452 | B1 | | 12/2001 | Berrier et al. | |
| 6,454,969 | B1 | * | 9/2002 | Nishihara | .................... 252/609 |

FOREIGN PATENT DOCUMENTS

| EP | 0 484 959 A2 | 5/1992 |
| EP | 1 013 698 A1 | 6/2000 |

* cited by examiner

*Primary Examiner*—Marc S Zimmer
(74) *Attorney, Agent, or Firm*—Buchanan Ingersoll & Rooney PC

(57) ABSTRACT

The invention relates to the field of silicon resins, particularly polymethylvinylsiloxane resins. The invention more specifically relates to a method for the production of polymethylvinylsiloxane resins comprising at least two different types of siloxy motifs $R_3SiO_{1/2}$ (motif M) and $SiO_{4/2}$ (motif Q, optionally $Q^{OH}$), said method comprising the following steps: a) producing a siloxane resin comprising motifs Q by acidic hydrolysis of a siloxane resin precursor, preferably an alkaline silicate; b) functionalizing the siloxane resin obtained in step a) with halogenosilanes in the presence of an apolar solvent, the functionalizing generating sub-products including volatile oligosiloxanes (silox); c) recovering silox produced in step b) in a solution in the apolar solvent; and d) subjecting the resin functionalized in step b) to rearrangement with the aid of a strong base in order to eliminate the silanols, wherein at least a part of the silox produced during step b) and recovered in step c) is recycled.

16 Claims, No Drawings

METHOD FOR THE PRODUCTION OF POLYMETHYLVINYLSILOXANE RESINS WITH RECYCLING OF VOLATILE OLIGOORGANOSILOXANES

CROSS-REFERENCE TO RELATED APPLICATIONS

This application is the U.S. national stage of International Application No. PCT/FR2004/050028, filed Jan. 26, 2004 and claims priority under 35 U.S.C. §119 of Application No. 03/01342, filed in France on Feb. 5, 2003.

The present invention relates to the field of silicone resins, in particular polymethylvinylsiloxane resins.

More precisely, the present invention relates to a method of preparing polymethylvinylsiloxane resins, in which method the volatile silicone compounds produced during functionalization of the resin are recycled.

Polymethylvinylsiloxane resins are especially used in an adhesion modifier system in curable silicone compositions (especially those that can be cured by Si—H/SiVi polyaddition) in the nonstick paper field. The function of such resins is generally to make it possible to adjust the debonding force between nonstick films obtained by curing the silicone compositions.

The synthesis of a polymethylvinylsiloxane resin is carried out in the following steps:

① preparation and stabilization of the polysilicic acid starting from natural sodium silicate. The stabilization is achieved using a secondary alcohol, such as isopropyl alcohol, in HCl acid medium. A resin of the $SiO_{4/2}$ (Q) type having SiOH units on its surface is obtained (called resin $Q^{OH}$);

② functionalization of the SiOH units of the resin Q by functionalized or nonfunctionalized chlorosilanes and/or disiloxanes in the presence of an apolar aprotic organic solvent of the toluene or xylene type; and ③ rearrangement of the resin structure through the action of a strong base in order to remove the silanols.

A drawback of this method is that, after the step of functionalizing SiOH units on the resin Q, a large amount of oligosiloxanes, mainly linear organosiloxanes called "silox" by-products, are produced from the chlorosilanes. These silox by-products are mainly hexamethyldisiloxane ($M_2$), pentamethylvinyldisiloxane ($MM^{Vi}$), tetramethyldivinyldisiloxane ($M^{Vi}_2$) and heptamethylvinyltrisiloxane.

These reaction by-products, which are not used, represent a substantial cost because the organovinylsiloxanes used for the functionalization are expensive. Furthermore, the by-products obtained after reaction are generally recovered in order to be reprocessed. The cost of this reprocessing is added to that of the products.

Reaction products, such as isopropyl alcohol, are also present at the end of the reaction in not insignificant amounts.

The industries involved in the technical field in question are therefore awaiting a method of preparing polymethylvinylsiloxane resins after which certain recovered reaction products or by-products are present in a limited amount.

As an illustration of the general technological background, mention may be made of the document EP-A-1 013 698 which relates to a method of synthesizing cyclic organosiloxanes of high molecular weight, which includes steps of recycling volatile cyclic organosiloxanes of low molecular weight that are generated during said synthesis.

The main objective of the present invention is therefore to propose a method of preparing polymethylvinylsiloxane resins allowing the silox by-products, produced during the step of functionalizing the resin Q, to be at least partly recycled.

Another objective of the present invention is to provide a method of preparing polymethylvinylsiloxane resins in which the recycling of the silox by-products does not interfere with the final characteristics of the resin obtained.

These objectives, among others, are achieved by the present invention that relates to a method of preparing a polyorganosiloxane resin having at least two different types of siloxy units, namely $R_3SiO_{1/2}$ units (M units) and $SiO_{4/2}$ units (Q, and possibly $Q^{OH}$, units), characterized in that it comprises the following steps:

a. preparation of a siloxane resin comprising Q units, by acid hydrolysis of a siloxane resin precursor, preferably an alkali metal silicate;

b. functionalization of the siloxane resin obtained in step a) with halosilanes in the presence of an apolar solvent, this functionalization generating by-products comprising volatile oligosiloxanes (silox by-products);

c. recovery of the silox by-products that are produced in step b) in solution in the apolar solvent; and d. rearrangement of the resin functionalized in step b) using a strong base in order to remove the silanols, and in that at least some of the silox by-products produced during step b) and recovered in step c) are recycled.

According to one noteworthy feature of the method according to the invention, the recycling of the silox by-products consists in using, in step b), said silox by-products to functionalize the polyorganosiloxane resin obtained in step a).

Preferably, during step a) of the method, the following products are introduced, into the stirred preparation vessel, in the following order:
an acid, preferably HCl;
an alkali metal silicate, preferably sodium silicate; and
a hydrogen bond initiator/stabilizer, preferably consisting of isopropyl alcohol.

Preferably, the temperature in the reaction vessel at the start of step a) is below 25° C. and preferably between 2 and 15° C.

According to a variant of the invention, the hydrogen bond initiator/stabilizer may also be ethanol or butanol (see R. K. Iler, "*The Chemistry of Silica*", p. 291, published by J. Wiley and Son, New York 1979).

The alkali metal silicate acting as resin precursor is converted into polysilicic acid in the presence of acidified water at a pH≦2. This acid forms a network of Q units.

Once the resin Q, optionally $Q^{OH}$, has formed, step b) of functionalizing this resin by means of halosilanes or oligosiloxanes in the apolar solvent takes place.

Preferably, the functionalization step b) consists in carrying out the following operations:
introducing the following products into the stirred preparation vessel, in the following order:
the silox by-products dissolved in an apolar solvent, preferably xylene, possibly comprising isopropyl alcohol and water,
optionally, an apolar solvent, preferably xylene,
optionally, oligoorganosiloxanes and
the halosilanes;
heating to a temperature close to the reflux temperature of the hydrogen bond initiator/stabilizer, preferably that of isopropyl alcohol, namely between 70 and 80° C.;
optionally, adding apolar solvent;
optionally, cooling;
separating the aqueous phase from the nonaqueous phase, preferably by decanting;

removing the aqueous phase; and recovering the nonaqueous phase containing the resin.

This functionalization involves hydrophobicizing the resin, which migrates into the apolar solvent present in the medium.

The apolar solvent used is advantageously xylene. It may also be toluene, white spirit, hexane, cyclohexane, heptane, Isopar® K, Isopar® M, Exxsol D60, Rhodiasolv® RPDE or cycloheptane.

Noteworthily, the amount by volume of isopropyl alcohol introduced into the reaction vessel is up to 50% in excess relative to the volume of hydrochloric acid.

Advantageously, the necessary amount of isopropyl alcohol may be partly supplied by the solution containing the silox by-products. This is because it is apparent that the silox solution in the apolar solvent also includes a residual amount of isopropyl alcohol.

According to another noteworthy feature, the halosilanes used are chlorosilanes taken from the group comprising: trimethylchlorosilane, dimethylvinylchlorosilane and methylvinyldichlorosilane.

According to a preferred embodiment, the silox/halosilane ratio used during the step of functionalizing the resin Q is less than or equal to 2 and preferably between 0.25 and 1.

After having recovered the nonaqueous phase containing the resin, it is prudent to carry out a distillation with stirring so as to at least partly recover the silox reaction by-products in solution in the apolar solvent, these being able to be recycled.

This distillation is preferably carried out at atmospheric pressure.

The rearrangement (or progressing) step advantageously consists in carrying out the following operations:
- the strong base, preferably KOH, is introduced into the preparation vessel;
- the reaction mixture is heated to a temperature close to its reflux temperature;
- the water of condensation is removed, together with solvent and silox by-products dissolved in the apolar solvent, which by-products may also be recycled;
- optionally, the reaction mixture is cooled;
- an apolar solvent, preferably xylene, is added;
- the strong base is neutralized with an acid, preferably acetic acid;
- the water produced by distillation is removed;
- optionally, the neutralization product is separated by filtration; and
- the nonaqueous resin solution is recovered.

This rearrangement step makes it possible to reduce the number of residual SiOH units, especially by condensation and redistribution.

According to a preferred feature of the method according to the invention, the silox by-products belong to the group comprising: hexamethyldisiloxane, pentamethylvinyldisiloxane, tetramethyldivinyldisiloxane and 3-heptamethylvinyltrisiloxane.

Thus, another subject of the invention relates to the resin as obtained by the method.

Preferably the R groups of this resin represent, independently and at least partly:
- alkyl groups, preferably $C_1$-$C_{18}$ alkyl groups;
- $C_2$-$C_{20}$, preferably $C_2$-$C_{12}$ alkenyl groups;
- preferably at least 80 mol % of radicals R representing a methyl group; and
- at least 0.1 mol %, preferably 0.5 to 5 mol %, of radicals R representing an alkenyl or alkenyloxy-alkylene group linked to the silicon ("Si-alkenyl"), the vinyl radical (Vi) being particularly preferred as R=alkenyl;

the resin containing less than 2.5 mol % (preferably less than 0.5 mol %) of silanol functional groups.

Noteworthily, the polyorganosiloxane resin obtained from the method has a number-average molecular weight of between 2 500 and 5 000 polystyrene equivalents.

According to a variant of the invention, the resin obtained by the method according to the invention furthermore includes D and/or T siloxy units defined below:

D: $(R)_2SiO_{2/2}$
T: $(R) SiO_{2/2}$

Another subject of the present invention is a silicone composition characterized in that it includes the silox by-products recovered in step c) of the method described above in solution in an apolar solvent.

According to a preferred embodiment, the composition comprises:
- 10 to 60% xylene;
- 10 to 30% hexamethyldisiloxane;
- 5 to 10% pentamethylvinyldisiloxane or 3-heptamethylvinyltrisiloxane;
- 0 to 3% tetramethyldivinyldisiloxane;
- 10 to 50% isopropyl alcohol; and
- 0 to 10% water.

The present invention also relates to the use of the silicone compounds recovered in step c) of the method according to the invention for functionalizing a polyorganosiloxane resin comprising at least two different types of siloxy units, namely $R_3SiO_{1/2}$ units (M units) and $SiO_{4/2}$ units (Q units).

The following examples are given by way of indication and should not be considered as limiting the scope of the invention.

EXAMPLES

In all the examples below, the dry matter (DM) contents were obtained by evaporation: one hour at 150° C., in air, on a thermobalance of approximately 3 g of about 60% xylene solution.

The Vi (MW=27) and OH (MW=17) contents were determined by infrared on the DM values.

The number-average molecular weight $M_n$ and weight-average molecular weight $M_w$ obtained by GPC (gel permeation chromatography) are expressed as polystyrene equivalents; the truncations are indicated.

The viscosities η were measured at 25° C.

Example 1

Trial 1

Step a: Hydrolysis/Silylation 365 ml of 16.2% hydrochloric acid were introduced into a 3-liter jacketed reactor fitted with two counter-blades, an impeller-type stirrer, a condenser and a bottom valve.

The following were injected in succession, with stirring at 840 rpm, at room temperature:
- over 5 minutes, 805 ml of liquid sodium silicate of the Rhodia 7 N 34 type prediluted (600 ml of water+400 ml of silicate); NB: the temperature rose from 24 to 29° C.;
- 365 ml of isopropyl alcohol (IPA) over 3 minutes;
- 115 ml of xylene over 3 minutes; and
- a mixture containing 2.5 mol of trimethylchlorosilane and 0.6 mol of dimethylvinylchlorosilane over 10 minutes.

The reaction mass was heated for 1 hour to reflux and 175 ml of xylene were added in order to extract the resin. After decanting for 10 minutes, the aqueous hydrochloric solution was separated in order to isolate the xylene solution of MM$^{VI}$Q(OH) resin, this solution being left overnight at room temperature.

The average molecular weights were M$_n$=3480 and M$_w$=8300 (600-end truncation).

Step b: Condensation

A 1-liter reactor was charged with 662.4 g of xylene solution and then some of the volatile compounds were distilled with stirring, at atmospheric pressure, up to a bulk temperature of 138° C.; only traces of hydrochloric acid in solution, containing about 33% resin, then remained.

After cooling, 50% KOH in water was added at around 100° C./2000 ppm.

The reaction mass was heated for 6 hours to reflux at 140° C. and with stirring (960 rpm). The water of condensation was removed by means of a device of the Dean & Stark (DS) type. At the end of the reaction, the contents of the DS (about 50 ml) containing a few ml of aqueous layer were removed.

After cooling, 50 ml of xylene and 1.1 equivalents of acetic acid were added. The water formed was removed by azeotropic distillation to the Dean & Stark device over about 45 minutes.

The solid potassium acetate residue was separated by filtration over Primisil (or optionally Clarcel) and, after rinsing and 60% dilution, a xylene solution of resin, containing 220 g of resin, with η=14.8 mm$^2$/s, was obtained. The GPC analysis showed that the molecular weights were M$_n$=4160 and M$_w$=8850 (600-end truncation). The dry matter contained 2.08% Vi and 0.15% OH.

Example 2

Trial 2

The procedure was as in Example 1, but with cooling of the HCl solution to 2° C. After pouring in the sodium silicate the temperature was 13° C.

After step a), GPC gave M$_n$=2510 and M$_w$=6980 (500-end truncation).

In a similar manner to step b), a 60% xylene solution (η=6.6 mm$^2$/s) containing about 235 g of dry resin was obtained.

GPC gave M$_n$=2900 and M$_w$=5370 (770-end truncation)

The DM had a Vi content of 2.45% and an OH content of 0.1%.

Example 3

Trial 3

The procedure was as in Example 1, but the temperature rose from 26 to 33° C.

In a manner similar to step b), a 60% xylene solution (η=21.2 mm$^2$/s) containing about 210 g of dry resin was obtained.

The DM had a Vi content of 2.03% and an OH content of 0.17%.

Example 4

Trial 4

An MM$^{Vi}$Q(OH) resin having a 35% solids content was prepared in a manner similar to Example 1, step a).

GPC analysis showed that the molecular weights expressed in polystyrene equivalents were M$_n$=3 780 and M$_w$=8860 (600-end truncation). The DM had an OH content of 2.4% and a Vi content of 2.2%.

657 g of this solution were concentrated, in the 1-liter reactor, to 425 g by distillation and then 2.46 g of 50% potassium hydroxide were added to the residue. The reaction mass was maintained for about 1.5 hours at reflux and the bulk temperature lowered from 120 to 113° C. as the water present was not removed.

50 ml of xylene and 1.45 g of acetic acid were added to neutralize the potassium hydroxide. The Dean & Stark device was adapted so as to separate off the water of neutralization (½ hour distillation at 120-140° C.).

After filtration and dilution to 60%, a resin solution was obtained: η=7.3 mm$^2$/s with M$_n$=2040 and M$_w$=4990 (600-end truncation). The DM had a Vi content of 2.34% and an OH content of 0.7%.

Example 5

Trial 5 with Silox Recycling

The GC composition of the silox solution to be recycled was approximately the following: 1.3% water; 14.1% IPA; 53% xylene; 0.5% trimethylsilanol; 18% hexamethyldisiloxane or M$_2$; 10.8% pentamethylvinyldisiloxane or MM$^{VI}$; and 1.3% tetramethyldivinyldisiloxane or M$_2^{Vi}$.

365 ml of 16.2% hydrochloric acid were introduced into a 3-liter jacketed reactor fitted with counter-blades, an impeller-type stirrer, a condenser and a bottom valve. The contents of the reactor and the silicate were cooled.

The following were injected in succession with stirring at 840 rpm:

800 ml of Rhodia 7 N 34 liquid sodium silicate prediluted (600 ml of water+400 ml of silicate), the temperature rising from 6 to 11° C.;

294 ml of isopropyl alcohol over 1.5 minutes;

395 g of silox+8.1 g of M$_2$ over 0.5 minute;

41 ml (0.3 mol) of dimethylvinylchlorosilane over 3 minutes; and 158 ml (1.25 mol) of 142 ml trimethylchlorosilane over 6 minutes.

The mixture was heated for 1.5 hours at reflux (81° C.) with stirring and then 47 ml of xylene were added. The reaction mixture was decanted for 10 minutes and the aqueous hydrochloric solution was separated off in order to maintain the xylene solution of MM$^{Vi}$Q(OH) resin. This solution was left overnight at room temperature.

The condensation was continued according to step b), Example 1. The 60% xylene resin solution had a viscosity η=9.5 mm$^2$/s and a solids content of about 220 g.

The DM had a Vi content of 2.21% and an OH content of 0.14%.

Example 6

Impact of the Sodium Silicate End-Of-Pouring Temperature

Reactions were carried out using the same quantities of reactants as in Example 1 and by varying the hydrolysis temperatures. The analytical characteristics of the resin obtained without silox recycling and after silox treatment with 2000 ppm of potassium hydroxide are given in Table 1.

TABLE 1

| Trial | Initial temperatures of the reactants | Silicate end-of-pouring temperature (° C.) | $M_n$ | $\eta$: 60% (mm$^2$/s) | % Vi (IR) | % OH (IR) |
|---|---|---|---|---|---|---|
| 6 | HCl/silicate: 2° C. IPA: RT | 7 | 2005 | 7.4 | 2.5 | 0.1 |
| 7 | HCl: 2° C. silicate/IPA: RT | 13 | 2886 | 6.6 | 2.4 | 0.1 |
| 8 | HCl: 9° C. silicate/IPA: RT | 18 | 3072 | 8.1 | 2.3 | 0.1 |
| 9 | HCl/silicate: 13° C. IPA/RT | 20 | 3133 | 9.2 | 2.3 | 0.1 |
| 10 | HCl/silicate/IPA: 24° C. | 29 | 3668 | 14.8 | 2.1 | 0.1 |
| 11 | HCl/silicate/IPA: 26° C. | 33 | 3970 | 21.2 | 2.0 | 0.2 |

This shows that the increase in sodium silicate end-of-pouring temperature results in an increase in the viscosity of the resin and a decrease in the number of vinyl groups.

Other trials were carried out using the same amounts of reactants as in Example 5 with silox recycling. The results obtained are given in Table 2 below.

TABLE 2

| Trial | Pour start/end temperature (° C.) | Pure IPA | SiCl/silox | $M_n/M_w$ (PST) | $\eta$ at 60% (mm$^2$/s) | % Vi (IR) | % OH (IR) |
|---|---|---|---|---|---|---|---|
| 12 | 6/11 | (1.5') | 50/50(0.5') | 3330/5570 | 9.5 | 2.2 | 0.1 |
| 13 | 12/16 | (1.5') | 50/50(0.5') | 3310/5730 | 11.3 | 2.1 | 0.1 |
| 14 | 2/19 | (2') | 50/50(3') | 3380/5690 | 11.3 | 2.0 | 0.1 |
| 15 | 11/20 | (2') | 50/50(3') | 3330/5570 | 11.1 | 2.0 | 0.2 |
| 16 | 10/23 | (2') | 50/50(3') | 3400/5820 | 11.8 | 2.1 | 0.1 |

This shows that the viscosity of the resins with recycling that are obtained with a low end-of-pouring temperature have a slightly higher viscosity than that of the resins without recycling and that, most particularly, the viscosity of the resins with recycling are considerably less affected by the sodium silicate end-of-pouring temperatures than the resin viscosities without recycling.

Example 7

Effect of Replacing Isopropanol with a Water/Isopropanol Azeotrope and Effect of Increasing the Amount of Isopropanol In Trial 17, the pure isopropanol was replaced with a water/isopropanol azeotrope (GC contents normalized to 100: 72.7% alcohol; 24.5% water; 2.0% acetone and 0.6% toluene).

Since isopropanol (IPA) is described in the literature as a compound that slows down the growth of polysilicic acid, the assumption was made that the viscosity of the resins could be reduced by increasing the amount of IPA without having to reach very low temperatures. Additional trials were carried out for this purpose, using the same amounts of reactants as Example 5, but without IPA. The results are given in Table 3 below.

TABLE 3

| Trial | Start/finish temperature (° C.) | IPA/water: excess (excess calculated relative to the amount given in Example 5) | % silox | $M_n/M_w$ | $\eta$ at 60% (mm$^2$/s) | % Vi (IR) | % OH (IR) |
|---|---|---|---|---|---|---|---|
| 17 | 14/19 | Azeotrope: 0% | 50 | 3530/6040 | 12.2 | 2.0 | 0.1 |
| 18 | 14/19 | Azeotrope: +20% | 50 | 3110/4930 | 8.4 | 2.0 | 0.1 |
| 19 | 14/19 | Azeotrope + pure IPA: +40% | 50 | 3110/4930 | 7.9 | 2.3 | 0.1 |

The resin obtained in Trial 17 had a viscosity of 12.2 mm$^2$/s, which was greater than that (11.3 mm$^2$/s) found for Trial 14 with an identical sodium silicate end-of-pouring temperature and with pure isopropanol. It should be noted that the increase in the amount of IPA from 0 to 20 or 40% does allow the viscosity to be lowered, but there is little difference between 20 and 40%.

Example 8

Impact of the Amount of Silox

Several amounts of chlorosilanes and silox were tested under favorable temperature conditions: 5° C. at the start of silicate pouring and +20% IPA. The number of moles of silylating agent was 0.6 mol in respect of the vinyl part and 2.5 mol in respect of the M groups, which were able to be introduced in chlorosilane or silox form ($M_2$, $MM^{Vi}$ or $M_2^{Vi}$). In Table 4, the percentages correspond to the distribution of the silylating agents or in parts when more than 0.6 mol of vinyl and 2.5 mol of $M^{Vi}$ or M units are added.

TABLE 4

| Trial | Start/finish temperature (° C.) | Chlorosilanes/silox | $M_n/M_w$ | η at 60% (mm²/s) | % Vi (IR) | % OH (IR) |
|---|---|---|---|---|---|---|
| 20 | 5/11 | 100%/0% | 2880/4210 | 8.0 | 2.5 | <0.1 |
| 21 | 5/10 | 60%/40% | 3030/4620 | 8.6 | 2.4 | <0.1 |
| 22 | 5/10 | 50%/50% | 3100/4880 | 8.5 | 2.2 | <0.1 |
| 23 | 5/10 | 50 parts/75 parts | 3140/5030 | 8.6 | 2.3 | <0.1 |
| 24 | 6/11 | 50 parts/100 parts | 3170/5030 | 8.7 | 2.4 | <0.1 |

At this silicate start-of-pouring temperature, there is a 0.5 point increase in the viscosity between the use of pure chlorosilanes and a chlorosilane/silox mixture, which is a very small increase. The increase in the amount of silox for a constant vinyl molar content introduced results in a small reduction in the amount of grafted vinyl, making it possible to remain within the specifications.

Example 9

Distribution of the Vinyls with and without Chlorosilane Recycling

The distribution of the vinyls, grafted onto the resin and hydrolyzed (present in solution with the resin, or in the silox by-products resulting from the concentration of the resins followed by the potassium hydroxide treatment and finally the neutralization with acetic acid (also called cohobation)), was determined for trials without recycling and with recycling. Three analytical techniques were required: GC, IR and ethoxylation. The differences from 100% in the totals can be ascribed to the sum of the measurement uncertainties but also to the type of detection, which differed from one method to another.

Trials without chlorosilane recycling (Table 5):

TABLE 5

| Trial | In the volatiles: moles of vinyl assay by GC | In solution with the resin: assayed by ethoxylation | On the resin: moles of vinyl assayed by IR | Total |
|---|---|---|---|---|
| 3: $T_{pour\ end}$ = 33° C. | 0.31 mol, i.e. 51.6% | 0.094 mol, i.e. 15.6% | 0.16 mol, i.e. 26.6% | 93.8% |
| 21: $T_{pour\ end}$ = 21° C. | 0.242 mol, i.e. 40.3% | 0.061 mol, i.e. 10.2% | 0.21 mol, i.e. 35% | 85.5% |
| 16: $T_{pour\ end}$ = 11° C. | 0.195 mol, i.e. 32.5% | 0.122 mol, i.e. 20.3% | 0.214 mol, i.e. 35.7% | 85.5% |

Trial with 50% recycled silox (Table 6):

TABLE 6

| Trial | In the volatiles: moles of vinyl assay by GC | In solution with the resin: assayed by ethoxylation | On the resin: moles of vinyl assayed by IR | Total |
|---|---|---|---|---|
| 9: $T_{pour\ end}$ = 20° C. | 0.311 mol, i.e. 51.8% | 0.098 mol, i.e. 16.3% | 0.159 mol, i.e. 26.5% | 94.7% |
| 17: $T_{pour\ end}$ = 10° C. | 0.308 mol, i.e. 51.3% | 0.086 mol, i.e. 14.3% | 0.181 mol, i.e. 30.2% | 95.8% |

As regards the trials carried out with chlorosilanes, but without silox recycling, an increase in the amount of grafting is observed as the sodium silicate end-of-pouring temperature decreases. As regards the trials with silox recycling, this increase in the amount of vinyl functional groups grafted onto the resin is again found when the silicate end-of-pouring temperature is low.

The reduction in silicate end-of-pouring temperature is therefore advantageous as regards the chlorosilane ($Me_2$ ViSiCL) functionalization yield.

The invention claimed is:

1. A method of preparing a polyorganosiloxane resin having at least two different types of siloxy units, $R_3SiO_{1/2}$ units (M units) and $SiO_{4/2}$ units (Q, and optionally $Q^{OH}$, units, where said $Q^{OH}$ units are Q units having SiOH units on the surface),
wherein R is independently selected from $C_1$-$C_{18}$ alkyl groups and $C_2$-$C_{20}$ alkenyl groups;
said method comprising the following steps:
   (a) preparing a polyorganosiloxane resin comprising Q units from an alkali metal silicate in acid medium in a reaction vessel;
   (b) functionalizing the siloxane resin obtained in step (a) with
      (1) halosilanes in the presence of an apolar solvent, wherein by-products comprising volatile oligosiloxanes (silox by-products) are formed during the functionalizing process; and
      (2) silox by-products recovered in step (c);
   (c) recovering the silox by-products that are produced in step (b); and
   (d) subjecting the resin functionalized in step (b) to reaction with a strong base in order to remove the silanes,
wherein at least a portion of the silox by-products produced during step (b) and recovered in step (c) are recycled into step (b), and
wherein the viscosity of the resin formed by said process is more consistent across reaction temperatures in step (a) than the viscosity of a resin formed by the same process without recycling at least a portion of the silox by-products produced during step (b) and recovered in step (c) into step (b).

2. The method as claimed in claim 1, wherein during step (a), the following products are introduced, into a stirred reaction vessel, in the following order:
   (i) an acid;
   (ii) an alkali metal silicate; and
   (iii) a hydrogen bond initiator/stabilizer.

3. The method as claimed in claim 1, wherein during step (b), the following operations are carried out:
   (b1) introducing the following products into the stirred reaction vessel, in the following order:
      (i) the silox by-products dissolved in an apolar solvent;
      (ii) optionally, an apolar solvent;
      (iii) optionally, oligoorganosiloxanes; and
      (iv) the halosilanes;
   (b2) heating to a temperature close to the reflux temperature of a hydrogen bond initiator/stabilizer;
   (b3) optionally, adding the apolar solvent;
   (b4) optionally, cooling;
   (b5) removing the aqueous phase from the nonaqueous phase; and
   (b6) recovering the nonaqueous phase containing the resin.

4. The method as claimed in claim 1, wherein the temperature in the reaction vessel at the start of step (a) is below 25° C.

5. The method as claimed in claim 2, wherein the acid introduced in step (a) is hydrochloric acid and the hydrogen bond initiator/stabilizer introduced in step (a) is isopropyl alcohol, and wherein the amount by volume of isopropyl alcohol introduced into the reaction vessel is up to 50% in excess relative to the volume of hydrochloric acid.

6. The method as claimed in claim 1, wherein the halosilanes are chlorosilanes selected from the group consisting of trimethylchlorosilane, dimethylvinylchlorosilane and methylvinyldichlorosilane.

7. The method as claimed in claim 1, wherein the ratio of silox/halosilane in functionalization step (b) is less than 2.

8. The method as claimed in claim 1, wherein the step (d), comprises the following steps:
   (c1) introducing the strong base into the reaction vessel;
   (c2) heating the reaction mixture to a temperature close to its reflux temperature;
   (c3) removing the water of condensation, together with solvent and silox by-products dissolved in the apolar solvent, which by-products may also be recycled;
   (c4) optionally, cooling the reaction mixture;
   (c5) adding an apolar solvent;
   (c6) neutralizing the strong base with an acid;
   (c7) removing the water produced by distillation;
   (c8) optionally, separating the neutralization product by filtration; and
   (c9) recovering the nonaqueous resin solution.

9. The method as claimed in claim 1, wherein the silox by-products are selected from the group consisting of hexamethyldisiloxane, pentamethylvinyldisiloxane, tetramethyldivinyldisiloxane and 3-heptamethylvinyltrisiloxane.

10. A silicone composition comprising the silox by-product recovered in step (c) of the method as claimed in claim 5 comprising:
   (i) 10 to 60% xylene;
   (ii) 10 to 30% hexamethyldisiloxane;
   (iii) 5 to 10% pentamethylvinyidisiloxane or 3-heptamethylvinyltrisiloxane;
   (iv) 0 to 3% tetramethyldivinyldisiloxane;
   (v) 10 to 50% isopropyl alcohol; and
   (vi) 0 to 10% water.

11. A method for functionalizing a polyorganosiloxane resin comprising at least two different types of siloxy units, $R_3SiO_{1/2}$ units (M units) and $SiO_{4/2}$ units (Q units), said method comprising reacting said polyorganosiloxane resin with oligosiloxane compounds recovered as by-products in step (c) of claim 1.

12. The method as claimed in claim 2, wherein step (a) has at least one of the following features:
   (i) the acid is HCl;
   (ii) the alkali metal silicate is sodium silicate; and
   (iii) the hydrogen bond initiator/stabilizer is isopropyl alcohol.

13. The method as claimed in claim 3, having at least one of the following features:
   in step (b1)(i) the apolar solvent is xylene or a mixture of xylene, isopropyl alcohol and water;
   in step (b1)(ii) the apolar solvent is xylene;
   in step (b2) the system is heated to a temperature of between 70 and 80° C.;
   in step (b5) the aqueous phase is separated from the nonaqueous phase by decanting.

14. The method as claimed in claim 4, wherein the temperature in the reaction vessel at the start of step (a) is between 2 and 15° C.

15. The method as claimed in claim 7, wherein ratio of silox/halosilane in functionalization step (b) is between 0.25 and 1.

16. The method as claimed in claim 8, having at least one of the following features:
   the strong base in step (c1) is KOH;
   the apolar solvent in step (c5) is xylene; and
   the acid is step (c6) is acetic acid.

* * * * *